United States Patent [19]

Hamilton

[11] 4,083,907

[45] Apr. 11, 1978

[54] PROCESS FOR CHEMICALLY EMBOSSING HEAT-FOAMABLE RESINOUS MATERIAL USING AGUEOUS ALCOHOLIC, GROWTH-CONTROLLING PRINTING INK COMPOSITIONS

[75] Inventor: Artimus C. Hamilton, Medwag, Mass.

[73] Assignee: Congoleum Corporation, Kearny, N.J.

[21] Appl. No.: 685,868

[22] Filed: May 12, 1976

[51] Int. Cl.$^2$ .............................................. B29D 27/04
[52] U.S. Cl. ...................................... 264/52; 106/20; 260/2.5 H; 260/2.5 P; 260/29.6 MN; 264/DIG. 5
[58] Field of Search ................ 264/52, 46.6, DIG. 60, 264/DIG. 3, DIG. 5; 260/29.6 MN, 2.5 H, 2.5 P; 106/20

[56] References Cited

U.S. PATENT DOCUMENTS

| | | | |
|---|---|---|---|
| 3,293,094 | 12/1966 | Nairn et al. | 264/52 X |
| 3,293,108 | 12/1966 | Nairn et al. | 264/46.6 X |
| 3,819,783 | 6/1974 | Jones | 264/DIG. 60 |

OTHER PUBLICATIONS

"The Condensed Chemical Dictionary," Eighth Edition, revised by Gessner G. Hawley, New York, Van Nostrand, Reinhold, 1971, pp. 40 and 103.

*Primary Examiner*—Philip Anderson
*Attorney, Agent, or Firm*—Richard T. Laughlin

[57] ABSTRACT

An aqueous-alcoholic, foam-growth-controlling printing ink composition having a pH in the range of from about 8 to about 12 of use in the chemical embossing of heat-foamable and expandable resinous materials comprising: (1) from about 1% to about 15% of a foam-growth-controlling chemical agent, such as benzotriazole; (2) from about 1% to about 9% of a water-soluble or water-dispersible alcohol having from 1 to 6 carbon atoms, such as isopropanol; (3) from about 1% to about 11% of a pH controlling or buffering agent, such as ammonia or a water-soluble or water-dispersible alkylaminoalcohol having from 2 to 10 carbon atoms, such as 2-dimethylaminoalcohol, capable of creating or maintaining the pH of the aqueous-alcoholic, foam-growth-controlling printing ink composition in the range of from about 8 to about 12; (4) from about 30% to about 75% of an aqueous printing ink composition; and (5) from about 10% to about 40% of added water, all these percentages being by weight. Processes of applying such aqueous-alcoholic, foam-growth-controlling printing ink compositions to such heat-foamable and expandable resinous materials are also included.

16 Claims, No Drawings

PROCESS FOR CHEMICALLY EMBOSSING HEAT-FOAMABLE RESINOUS MATERIAL USING AGUEOUS ALCOHOLIC, GROWTH-CONTROLLING PRINTING INK COMPOSITIONS

THE FIELD OF THE PRESENT INVENTION

The present invention relates to improved aqueous-alcoholic, foam-growth-controlling printing ink compositions of use in chemical embossing techniques and to processes of using using such aqueous-alcoholic, foam-growth-controlling printing ink compositions in the chemical embossing of floor, ceiling, or wall coverings, desk, table, and counter tops; coated or impregnated fabrics; upholstery and clothing materials; book covers; automobile interiors; and like articles.

THE GENERAL BACKGROUND OF THE PRESENT INVENTION

Chemical embossing techniques have been use widely in industry in the manufacture of floor, ceiling, and wall coverings; desk, table, and counter tops; coated and impregnated fabrics; and like articles, as more particularly described in U.S. Pat. Nos. 3,293,094 and 3,293,108 which issued Dec. 20, 1966 to R. F. Nairn et al.

Such chemical embossing techniques have normally involved coating a base material, such as an asbestos sheet, with a substantially uniform layer of a resinous material, such as polyvinyl chloride or other resinous material. A foaming or blowing agent, such as azodicarbonamide, is normally uniformly dispersed in the resinous material and is adapted, upon subsequent heating to a sufficiently elevated temperature, to decompose and to liberate gaseous decomposition products to expand and create the foamed, blown resinous product.

One aspect of such chemical embossing techniques has comprised the printing of selected, predetermined areas of the surface of the heat-foamable resinous material, prior to the heating, with a foam-growth-controlling printing ink composition which is capable of affecting and changing the foam-growth of those selected, predetermined areas, when the heat-foamable resinous materials are subsequently heated to the required elevated temperature.

Such foam-growth-controlling printing ink compositions have contained either: (1) agents for inhibiting or suppressing the decomposition of the foaming or blowing agents to thus decrease the resulting expanding gaseous action on the foamable resinous materials and to correspondingly decrease the foam-growth in the selected, predetermined areas to which they are applied; or (2) agents for catalyzing or accelerating the decomposition of the foaming or blowing agents to thus increase the resulting gaseous action on the foamable resinous materials and to correspondingly increase the foam-growth in the selected, predetermined areas to whch they are applied.

As a consequence. the surface of the resulting, foamed or blown resinous materials have been given an embossed or relief pattern effect containing relatively higher areas or lands and relatively lower areas or valleys, thus providing excellent surface interest.

The foam-growth-controlling printing ink compositions have thus contained both: (1) the foam-growth-controlling agents; and (2) the pigments, ink, dyes, or other coloring materials, whereby the resulting embossed or relief pattern effects have been made to coincide very accurately and very precisely with the ink-printing pattern, thus creating excellent visual and tactile effects which are in substantially perfect alignment and registry at all times.

More specific details and particulars of such chemical embossing techniques may be found in the United States Patents previously referred to herein and such details and particulars are incorporated herein by reference thereto.

Although a number of organic solvent-based foam-growth-controlling printing ink compositions have been used previously in such chemical embossing manufacturing techniques, and have proved to be relatively successful therein, it is always desired to improve upon existing commercial and industrial techniques. Organic solvent-based printing inks are relatively expensive, are usually very difficult to remove or clean from printing equipment, are occasionally not adaptable for use with conventional commercial printing equipment, are often flammable or have relatively low flash points which are unfortunately conducive to dangerous or hazardous conditions, frequently cause significant waste, ecological, or pollution problems, and sometimes required costly and time-consuming solvent-recovery programs.

PURPOSES AND OBJECTS OF THE PRESENT INVENTION

It is therefore a principal purpose and object of the present invention to provide improved aqueous-alcoholic, foam-growth-controlling printing ink compositions for use with chemical embossing processes, which compositions are relatively less expensive, are normally easier to remove and clean from printing ink equipment, are more adaptable for use with conventional printing equipment, are less flammable and have higher or effectively no flash points, do not create dangerous or hazardous conditions, are less prone to create significant waste, ecological, or pollution problems, and normally do not require costly or time-consuming solvent recovery programs.

BRIEF SUMMARY OF THE PRESENT INVENTION

It has been found that such principal purposes and objects, as well as other principal purposes and objects which will become clear from a further reading and understanding of this disclosure, are achieved by providing an aqueous-alcoholic, foam-growth-controlling printing ink composition having a pH in the range of from about 8 to about 12 of use in the chemical embossing of heatfoamable and expandable resinous materials comprising: (1) from about 1% to about 15% of a foam-growth-controlling chemical agent, such as benzotriazole; (2) from about 1% to about 9% of a water-soluble or water-dispersible alcohol having from 1 to 6 carbon atoms, such as isopropanol; (3) from about 1% to about 11% of a pH controlling or buffering agent, such as ammonia or a water-soluble or water-dispersible alkylaminoalcohol having from 2 to 10 carbon atoms, such as 2-dimethylaminoethanol, capable of creating or maintaining the pH of said aqueous-alcoholic, foam-growth-controlling printing ink composition in the range of from about 8 to about 12; (4) from about 30% to about 75% of an aqueous printing ink composition; and (5) from about 10% to about 40% of added water, all percentages being by weight. Such an aqueous-alcoholic, foam-growth-controlling printing ink composition is capable of being applied to the surface of heat-foamable and expandable resinous materials in selected, predetermined areas in processes wherein the benefits and the advantages of chemical embossing manufacturing techniques may be realized without suffering many of the detriments and disadvantages previously encountered in the use of organic solvent-based printing ink compositions.

DESCRIPTION OF THE PREFERRED EMBODIMENT OF THE PRESENT INVENTION

THE FOAM-GROWTH-CONTROLLING AGENT

The improved aqueous-alcoholic, foam-growth-controlling printing ink compositions for controlling the foam-growth of heat-foamable and expandable resinous materials upon heating comprise a foam-growth-controlling agent which is present in an amount of at least about 1% and normally up to about 15% by weight, based on the total weight of the aqueous-alcoholic, foam-growth-controlling printing ink composition. Naturally, the amount of the foam-growth-controlling agent used in the formulation of the printing ink composition depends upon the degree of the embossing or relief effect which is desired or required.

Although the present invention will be described in greater particularity with respect to benzotriazole as the foam-growth-controlling agent, a more complete list of applicable and utilizable foam-growth-controlling agents includes: aminotriazole; 3-amino-1,2,4-triazole; 4-amino-1,2,4-triazole; 1-amino-1,2,3-triazole; 1-amino-1,2,3-triazole; 1-amino-1,3,4-triazole; 1,2,4-triazole; 1,2,3-triazole; mixtures of such triazoles; etc.

Such foam-growth-controlling agents must be sufficiently soluble or dispersible in the aqueous-alcoholic printing ink compositions and they must be sufficiently stable therein as not to be convertible, through hydrolysis or alcoholysis or otherwise, into other chemical forms in which they lose their foam-growth-controlling properties and characteristics.

THE ALCOHOL

The improved aqueous-alcoholic, foam-growth-controlling printing ink compositions also contain an alcohol which is water-soluble or water-dispersible, contains from 1 to 6 carbon atoms, and is present in an amount of from about 1% to about 9% by weight, based on the total weight of the aqueous-alcoholic, foam-growth-controlling printing ink composition.

Although such an alcohol is, of course, organic in nature, and is preferably an alkylalcohol, its concentration of only from about 1% to about 9% is to be contrasted to organic-solvent-based printing ink compositions of the prior art which normally contained organic solvents such as methyl ethyl ketone, methyl isobutyl ketone, xylol, toluol, etc., in concentrations of from about 45% to about 70% by weight.

Although the present invention will be described in greater particularity with respect to isopropanol as the preferred alkyl alcohol, a more complete list of applicable and utilizable alcohols includes: methanol, ethanol, 1-propanol, 1-butanol, 2-pentanol. hexanol, etc.

THE pH CONTROLLING OR BUFFERING AGENT

The improved foam-growth-controlling printing ink compositions also contain a pH controlling or buffering agent which is present in an amount of from about 1% to about 11% by weight, based on the total weight of the foam-growth-controlling printing ink composition.

Although the present invention will be described in greater particularity with respect to ammonia or 2-dimethylaminoethanol as the preferred pH controlling or buffering agents, a more complete list of applicable and utilizable agents which are capable of creating or maintaining a pH in the range of from about 8 to about 12 includes: boric acid-sodium tetraborate (borax) yielding a buffered pH of about 8.5; sodium tetraborate yielding a buffered pH of about 9.2; boric acid-sodium hydroxide yielding a buffered pH of about 9.2; sodium bicarbonate-sodium carbonate yielding a buffered pH of about 10.2; disodium phosphate-sodium hydroxide yielding a buffered pH of about 11.5; etc. The concentration of these buffering agents is normally in the range of about 0.1 molar, unless specifically indicated otherwise. Other alkylaminoalcohols are also of use and include: 2-diethylaminoethanol; 2-methylaminoethanol; 2-ethylaminoethanol; etc.

Care should be taken to maintain the pH of the aqueous-alcoholic foam-growth-controlling printing ink compositions within the indicated pH ranges of from about 8 to about 12. In the event that ammonia or other relatively volatile material is used to establish or to maintain the desired pH range, care should be taken and additional amounts of the ammonia or other alkaline materials or the other relatively volatile materials should be supplied, if and when needed, to prevent the pH from dropping below a value of about 8.

As used herein, the term "ammonia" is not intended to include pure ammonia such as the pure gas or the compressed or cooled liquid ammonia ($NH_3$) but is intended to include solutions of ammonia in water, i.e., aqua ammonia having from about 25% to about 30% $NH_3$, or from about 24° to about 27° Baumé

THE PRINTING INK

The specific water-base gravure printing ink which is employed does not relate to the essence of the present invention, other than the fact that it must be aqueous. It can be a pigment dispersion in a latex emulsion, or a solution, and water-soluble acrylic or melamine resins, for example, may be used. the remainder of the formulation of the printing ink composition is a solution.

specific suitable and utilizable printing ink compositions are: AIY-33 Yellow, AIR-39 Red, AIW-34 White, AIB-35 Phthalo Blue, AIC-28 Clear Aqueous Printing Inks from Custom Chemical Company. RBH-991B001 White, RBH-991B022 Lemon Chr. Yellow, RBH-991B003 Phthalo Blue, RBH-991B004 Furnace Black, etc., from Inmont Corporation and GV-21647 Vynaprint Black Conc. from Polychemical Corporation. These printing ink compositions may be used as is, or various combinations thereof may be employed to obtain various color and shade possibilities. The AIC-28 Clear Aqueous Printing Ink contains no color (0% pigments) and may be used as an extender, as well.

These aqueous printing ink compositions are present in amounts of from about 30% to about 75% by weight, based on the total weight of the aqueous-alcoholic, foam-growth-controlling composition.

Inasmuch as these aqueous printing ink compositions are commercially available and used as aqueous solutions or dispersions having specified concentrations of coloring materials by solids therein, the actual or real solids content of the ink, pigment, dye or other coloring material is actually in the range of from about 3% to about 45% of the total weight of the foam-growth-controlling printing ink composition. Naturally, aqueous printing ink compositions which are commercially available with pH ranges of from about 8 to about 12 are preferred, inasmuch as such will obviate the necessity of adjusting their pH values to such a range, prior to their use.

THE ADDED WATER

Water is normally included in added amounts of from about 10% to 40% in order to bring the consistency or the viscosity of the aqueous-alcoholic, foam-growth-controlling printing ink composition to desired ranges for best handling by the printing equipment. Such viscosities are normally in the range of from about 20 to about 60 seconds, Zahn 3 cup.

The invention will be further illustrated in greater detail by the following specific Examples. It should be understood, however, that, although these Examples may describe in particular detail some of the more specific features of the present invention, they are given for purposes of illustration and are not to be construed as limitative of the broader aspects of the present invention.

EXAMPLE I

The aqueous-alcoholic, foam-growth-controlling printing ink composition comprises:

| | |
|---|---|
| Benzotriazole | 6.5% |
| Isopropanol | 3.8% |
| 2-Dimethylaminoethanol | 4.1% |
| Added water | 22.8% |
| AIY-33 Yellow Aqueous Printing Ink; acrylic resin base; 30% pigments solids; 48.2% total non-volatiles; remainder water | 62.8% |

The benzotriazole, 2-dimethylaminoethanol, isopropanol and water are mixed under a high speed mixer and the resulting formulation is added to the AIY-33 aqueous printing ink composition with stirring. The pH of the aqueous-alcoholic, foam-growth-controlling remains in the range of 8 to 12 at all times during the Example. The foam-growth-controlling printing ink composition is printed on selected, predetermined areas of a gelled, foamable plastisol formulated by mixing the following ingredients on a Cowles mixer:

| | Parts |
|---|---|
| Polyvinyl chloride, dispersion grade, specific viscosity 0.6 | 50 |
| Polyvinyl chloride, dispersion grade, specific viscosity 0.4 | 50 |
| Butyl benzyl phthalate plasticizer | 25 |
| Di-(2-ethyl hexyl) phthalate plasticizer | 45 |
| Titanium dioxide pigment (55% solids) | 7 |
| Azodicarbonamide blowing agent | 3 |
| V. M. & P. naphtha (boiling range 190° – 275° F.) | 5 |

Heating at 375° F. decomposes the azodicarbonamide blowing agent to create the desired blowing and foaming function. An embossing depth of about 26 mils is obtained at about 59 mils foam. A wear layer of about 10 mils is used. The foam-growth-controlling properties and characteristics of the printing ink composition are well demonstrated in this Example.

ADDITIONAL EXAMPLES

The procedures described in Example I are followed substantially as set forth therein in the following Examples with the exception that the aqueous-alcoholic, foam-growth-controlling composition of Example I is replaced by the aqueous-alcoholic, foam-growth-controlling printing ink compositions indicated below. The results of these additional examples are generally comparable to the results of Example I and the foam-growth-controlling properties of the printing ink compositions are well demonstrated in these Examples.

| | | |
|---|---|---|
| EXAMPLE II. | Benzotriazole | 1.0% |
| | Isopropanol | 1.5% |
| | 2:Dimethylaminoethanol | 3.0% |
| | Added Water | 31.7% |
| | AIY-33 Yellow Aqueous Printing Ink | 62.8% |
| EXAMPLE III. | Benzotriazole | 9.8% |
| | Isopropanol | 5.7% |
| | 2-Dimethylaminoethanol | 6.2% |
| | Added Water | 33.2% |
| | AIY-33 Yellow Aqueous Printing Ink | 45.1% |
| EXAMPLE IV. | Benzotriazole | 6.5% |
| | Isopropanol | 3.8% |
| | Ammonia 26° Baume; 29.4% NH$_3$ | 4.1% |
| | Added Water | 22.8% |
| | AIY-33 Yellow Aqueous Printing Ink | 62.8% |
| EXAMPLE V. | Aminotriazole | 6.5% |
| | Isopropanol | 3.8% |
| | 2-Dimethylaminoethanol | 4.1% |
| | Added Water | 22.8% |
| | AIY-33 Yellow Aqueous Printing Ink | 62.8% |
| EXAMPLE VI. | Benzotriazole | 6.5% |
| | Methanol | 3.8% |
| | 2-Dimethylaminoethanol | 4.1% |
| | Added Water | 22.8% |
| | AIY-33 Yellow Aqueous Printing Ink | 62.8% |
| EXAMPLE VII. | Benzotriazole | 6.5% |
| | Ethanol | 3.8% |
| | 2-Dimethylaminoethanol | 4.1% |
| | Added Water | 22.8% |
| | AIY-33 Yellow Aqueous Printing Ink | 62.8% |
| EXAMPLE VIII. | Benzotriazole | 6.5% |

-continued

|  |  |  |
|---|---|---|
|  | Isopropanol | 3.8% |
|  | 2-Diethylaminoethanol | 4.1% |
|  | Added Water | 22.8% |
|  | AIY-33 Yellow Aqueous Printing Ink | 62.8% |
| EXAMPLE IX. | Benzotriazole | 6.5% |
|  | Isopropanol | 3.8% |
|  | 2-Dimethylaminoethanol | 4.1% |
|  | Added Water | 22.8% |
|  | AIR-39 Red Aqueous Printing Ink; acrylic resin base; 3.5% pigments solids; 30.5% total non-volatiles; remainder water | 62.8% |
| EXAMPLE X. | Benzotriazole | 6.5% |
|  | Isopropanol | 3.8% |
|  | 2-Dimethylaminoethanol | 4.1% |
|  | Added Water | 22.8% |
|  | AIW-34 White Aqueous Printing Ink; acrylic resin base; 30.0% pigments solids; 48.2% total non-volatiles; remainder water | 62.8% |
| EXAMPLE XI. | Benzotriazole | 6.5% |
|  | Isopropanol | 3.8% |
|  | 2-Dimethylamioethanol | 4.1% |
|  | Added Water | 22.8% |
|  | AIB-35 Phthalo Blue Aqueous Printing Ink; acrylic resin base; 7.0% pigments solids; total non-volatiles 31.0%; remainder water | 62.8% |
| EXAMPLE XII. | Benzotriazole | 6.5% |
|  | Isopropanol | 3.8% |
|  | 2-Dimethylaminoethanol | 4.1% |
|  | Added Water | 22.8% |
|  | AIc-28 Clear Extender Aqueous Printing Ink; acrylic resin base; 0% Pigments solids; total non-volatiles 28.6%; remainder water | 62.8% |

Although several specific Examples of the inventive concept have been described, the same should not be construed as limiting the broader aspects of the present invention which include other equivalents features and materials, as set forth and defined in the appended claims.

What is claimed is:

1. A process for chemically embossing heat-foamable and expandable resinous materials which comprises: applying to selected, predetermined portions of the surface of heat-foamable and expandable resinous materials containing a foaming or blowing agent capable of causing said resinous materials to grow and to expand upon heating an aqueous-alcoholic, foam-growth-controlling printing ink composition having a pH of from about 8 to about 12 and being capable of controlling the growth and the expansion of said resinous materials as a result of said heating, said foam-growth-controlling printing ink composition comprising: (1) a foam-growth-controlling chemical agent which is soluble or dispersible in said aqueous-alcoholic, foam-growth-controlling printing ink composition and sufficiently stable therein as to retain its foam-growth-controlling properties, said foam-growth-controlling chemical agent being a pentatomic heterocyclic ring compound containing three nitrogen atoms and two carbon atoms in the pentatomic heterocyclic ring and being capable of controlling the growth and the expansion of said resinous materials as a result of said heating; (2) a water-soluble or water-dispersible alcohol containing from 1 to 6 carbon atoms; (3) a pH controlling or buffering agent capable of creating or maintaining the pH of said aqueous-alcoholic, foam-growth-controlling printing ink composition in the range of from about 8 to about 12; (4) an aqueous printing ink composition; and (5) added water, sufficient to adjust the viscosity of said aqueous-alcoholic, foam-growth-controlling printing ink composition to desired levels for printing on said heat-foamable and expandable resinous materials; and heating said heat-foamable and expandable resinous materials whereby said selected, predetermined portions to which said aqueous-alcoholic, foam-growth-controlling printing ink composition was applied attain heights differing from the contrasting with those other portions to which said aqueous-alcoholic, foam-growth-controlling printing ink composition was not applied.

2. A process as defined in claim 1 wherein said foam-growth-controlling chemical agent is benzotriazole.

3. A process as defined in claim 1 wherein said foam-growth-controlling chemical agent is aminotriazole.

4. A process as defined in claim 1 wherein said alcohol is isopropanol.

5. A process as defined in claim 1 wherein said alcohol is methanol.

6. A process as defined in claim 1 wherein said alcohol is ethanol.

7. A process as defined in claim 1 wherein said pH controlling or buffering agent is 2-dimethylaminoethanol.

8. A process as defined in claim 1 wherein said pH controlling or buffering agent is 2-diethylaminoethanol 9. A process as defined in claim 1 wherein said pH controlling or buffering agent is ammonia.

10. A process as defined in claim 1 wherein said foam-growth-controlling chemical agent is benzotriazole; said water-soluble or water-dispersible alcohol is isopropanol; and said pH controlling or buffering agent is 2-dimethylaminoethanol.

11. A process as defined in claim 1 wherein said foam-growth-controlling chemical agent is benzotriazole; said water-soluble or water-dispersible alcohol is methanol; and said pH controlling or buffering agent is 2-dimethylaminoethanol.

12. A process as defined in claim 1 wherein said foam-growth-controlling chemical agent is benzotriazole; said water-soluble or water-dispersible alcohol is ethanol; and said pH controlling or buffering agent is 2-dimethylaminoethanol.

13. A process as defined in claim 1 wherein said foam-growth-controlling chemical agent is benzotriazole; said water-soluble or water-dispersible alcohol is isopropanol; and said pH controlling or buffering agent is ammonia.

14. A process as defined in claim 1 wherein said foam-growth-controlling chemical agent is benzotriazole; said water-soluble or water-dispersible alcohol is isopropanol; and said pH controlling or buffering agent is 2-diethylaminoethanol.

15. A process as defined in claim 1 wherein said foam-growth-controlling chemical agent is aminotriazole; said water-soluble or water-dispersible alcohol is isopropanol; and said pH controlling or buffering agent is 2-dimethylaminoethanol.

16. A process as defined in claim 1 wherein the aqueous-alcoholic, foam-growth-controlling printing ink composition has the following percentages by weight, based on the total weight of said aqueous-alcoholic, foam-growth-controlling printing ink composition:

| | |
|---|---|
| Foam-growth-controlling chemical agent | 1% to 15% |
| Water-soluble or water-dispersible alcohol | 1% to 6% |
| pH controlling or buffering agent | 1% to 11% |
| Aqueous printing ink composition | 30% to 75% |
| Added water | 10% to 40% |

* * * * *